(12) United States Patent
Gustafson et al.

(10) Patent No.: US 10,654,533 B2
(45) Date of Patent: May 19, 2020

(54) WHEEL DEBRIS EJECTOR FOR TRACKED VEHICLE

(71) Applicant: AGCO Corporation, Duluth, GA (US)

(72) Inventors: Alan D. Gustafson, Lakefield, MN (US); Derek Hruska, Lime Springs, IA (US)

(73) Assignee: AGCO Corporation, Duluth, GA (US)

( * ) Notice: Subject to any disclaimer, the term of this patent is extended or adjusted under 35 U.S.C. 154(b) by 160 days.

(21) Appl. No.: 15/725,082

(22) Filed: Oct. 4, 2017

(65) Prior Publication Data

US 2019/0100262 A1    Apr. 4, 2019

(51) Int. Cl.
*B62D 55/088*    (2006.01)
*B62D 55/06*    (2006.01)

(52) U.S. Cl.
CPC ........... *B62D 55/088* (2013.01); *B62D 55/06* (2013.01)

(58) Field of Classification Search
CPC .. B62D 55/088; B62D 55/06; B62D 55/0885; B60S 1/68
USPC .......................... 305/100, 107, 115; 404/129
See application file for complete search history.

(56) References Cited

U.S. PATENT DOCUMENTS

| | | | | |
|---|---|---|---|---|
| 3,068,711 | A * | 12/1962 | Francois | B62D 55/0885 474/164 |
| 5,018,591 | A * | 5/1991 | Price | B62D 55/08 180/9.48 |
| 2002/0167222 | A1* | 11/2002 | Grob | B62D 55/088 305/110 |
| 2005/0046277 | A1* | 3/2005 | Simons | B60S 1/68 305/110 |
| 2007/0284856 | A1* | 12/2007 | Shimizu | B60S 1/685 280/727 |

FOREIGN PATENT DOCUMENTS

JP        2014000868 A  *  1/2014

OTHER PUBLICATIONS

AG Storm Website, Track Wheel Cleaner as published @ http://agstormequipment.com/products/uncategorized/track-wheel-cleaners/.

* cited by examiner

*Primary Examiner* — S. Joseph Morano
*Assistant Examiner* — Jean W Charleston

(57) ABSTRACT

A debris ejector attached to the hub-facing surface of the rim of a tracked work vehicle. The debris ejector has a leading face that is shaped so to slope from a base adjacent the hub-facing surface towards a ridge of the debris ejector and also slant from an inner end of the debris ejector adjacent the inner edge of the rim to an outer end adjacent the outer edge of the rim such that the shape of the leading face redirects debris so that the debris moves away from the hub-facing surface and away from the disk as the wheel rotates.

8 Claims, 5 Drawing Sheets

WHEEL DEBRIS EJECTOR FOR TRACKED VEHICLE

BACKGROUND OF THE INVENTION

Field of Invention

This invention relates generally to wheels supporting an endless track work machine, and more particularly to a debris ejector attached to a wheel to remove debris away from the wheel.

Description of Related Art

A tracked work vehicle utilizes a propulsion system in which a continuous belt is frictionally driven as it is entrained about at least a pair of wheels. Typically, the tracked propulsion system utilizes multiple rollers to distribute the vehicle's weight within the track.

Tracked-type vehicles often encounter a problem in that as the vehicle runs through the field or over rough terrain, debris made up of dirt, small pebbles and the like collects inside the vehicle wheels. The shape of the wheels used with tracked propulsion system prevents a portion of the debris from escaping from the wheel during vehicle operation. This debris is typically very abrasive, and due to the tumbling and sliding action of the debris that occurs as the wheel turns, wears away the painted inner wheel surface, exposing the steel substrate and promoting rust.

Accordingly, it is desirable to remove debris or the like that collects on the wheel.

OVERVIEW OF THE INVENTION

In one embodiment, the invention is directed to a work machine having a tracked propulsion assembly with an endless track belt disposed about at least one wheel to enable movement of the endless track belt. The at least one wheel has an axle hub and a cylindrical rim connected to the axle hub with a disc at an inner edge of the rim. The rim provides a track-facing surface configured to engage the track and a hub-facing surface. The rim also has an outer edge configured to provide structural integrity. A debris ejector is attached to the hub-facing surface of the rim. The debris ejector has a leading face that is shaped so to slope from a base adjacent the hub-facing surface towards a ridge of the debris ejector and also slant from an inner end of the debris ejector adjacent the inner edge of the rim to an outer end adjacent the outer edge of the rim such that the shape of the leading face redirects debris so that the debris moves away from the hub-facing surface and away from the disk as the wheel rotates.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
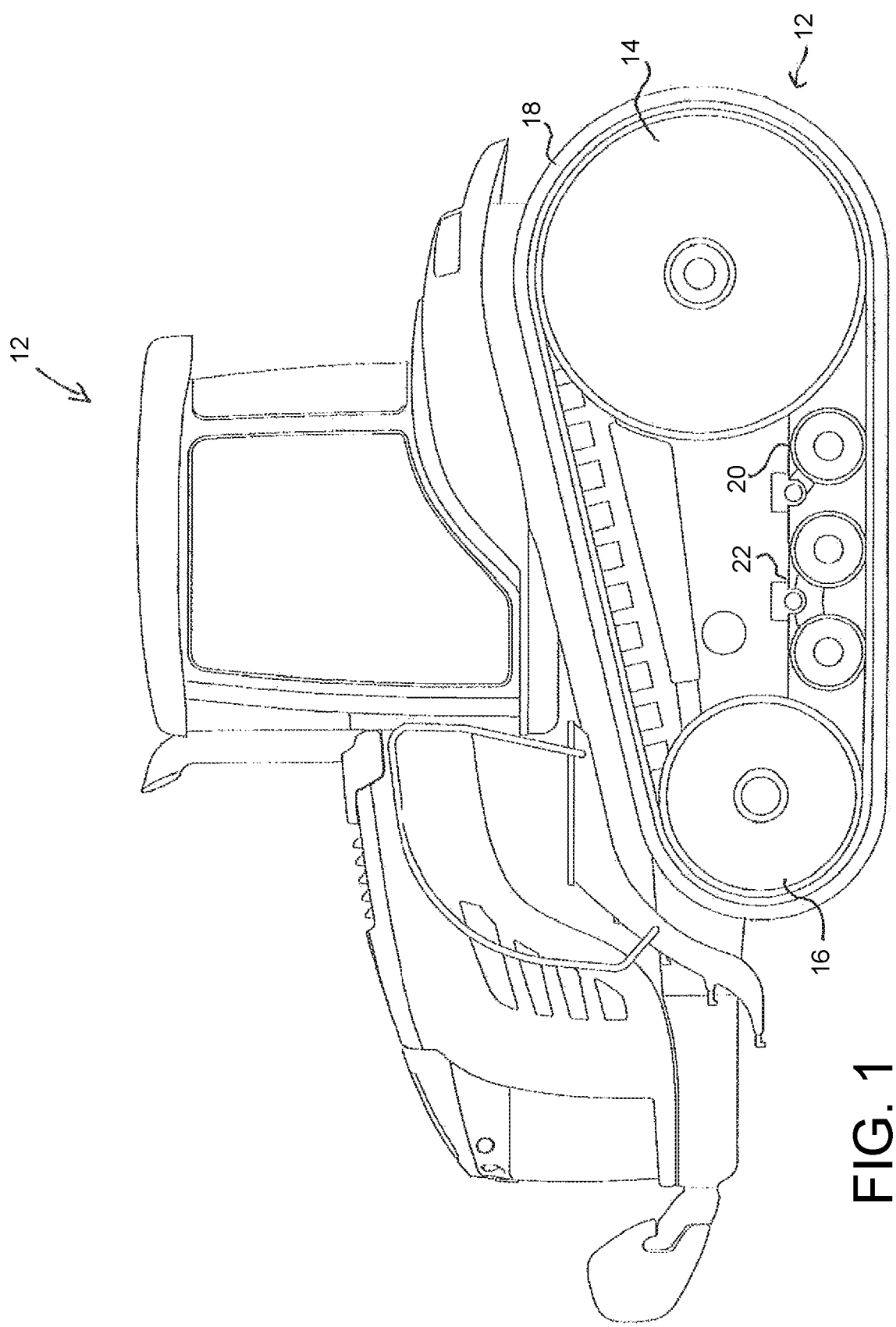
FIG. 1 is a side elevational view of a work vehicle embodying the present invention.

Referring initially to FIG. 1, a work machine 10 has track propulsion assemblies 12, only one shown, configured to drive the work machine over ground. Each track propulsion assembly 12 includes a drive wheel 14 and an idler wheel 16 with an endless rubber track belt 18 disposed about the drive and idler wheels 14, 16. In as much as the track propulsion assemblies 12 are substantially structurally and operatively similar, further reference will be made to only a single side of the work machine 10. In this example, an engine (not shown) powers the drive wheel 14, in a conventional manner, and frictionally drives the endless rubber belt 18. Located between the drive wheel 14 and the idler wheel 16 is a plurality of smaller supporting wheels or mid-rollers 20. The supporting wheels 20 are attached to a track roller frame 22 in any manner known in the art. The work machine 10, in the illustrated example, is an agricultural tractor positioning the drive wheel 14 near the back and the idler wheel 16 toward the front of the work machine 10.

Figure 2:
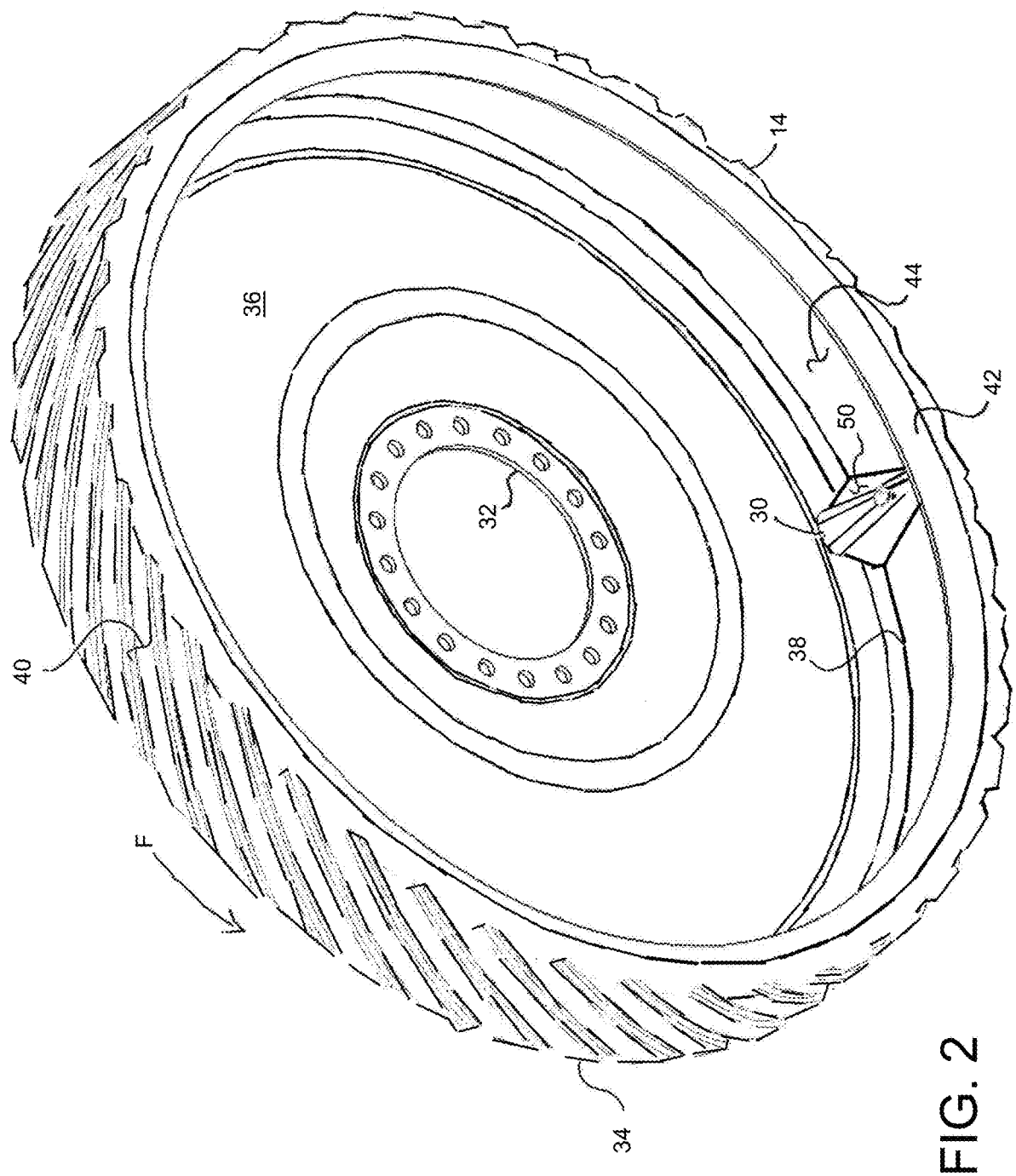
FIG. 2 is an enlarged perspective view of a wheel of the vehicle of FIG. 1 having a debris ejector of the present invention.
Figure 3:
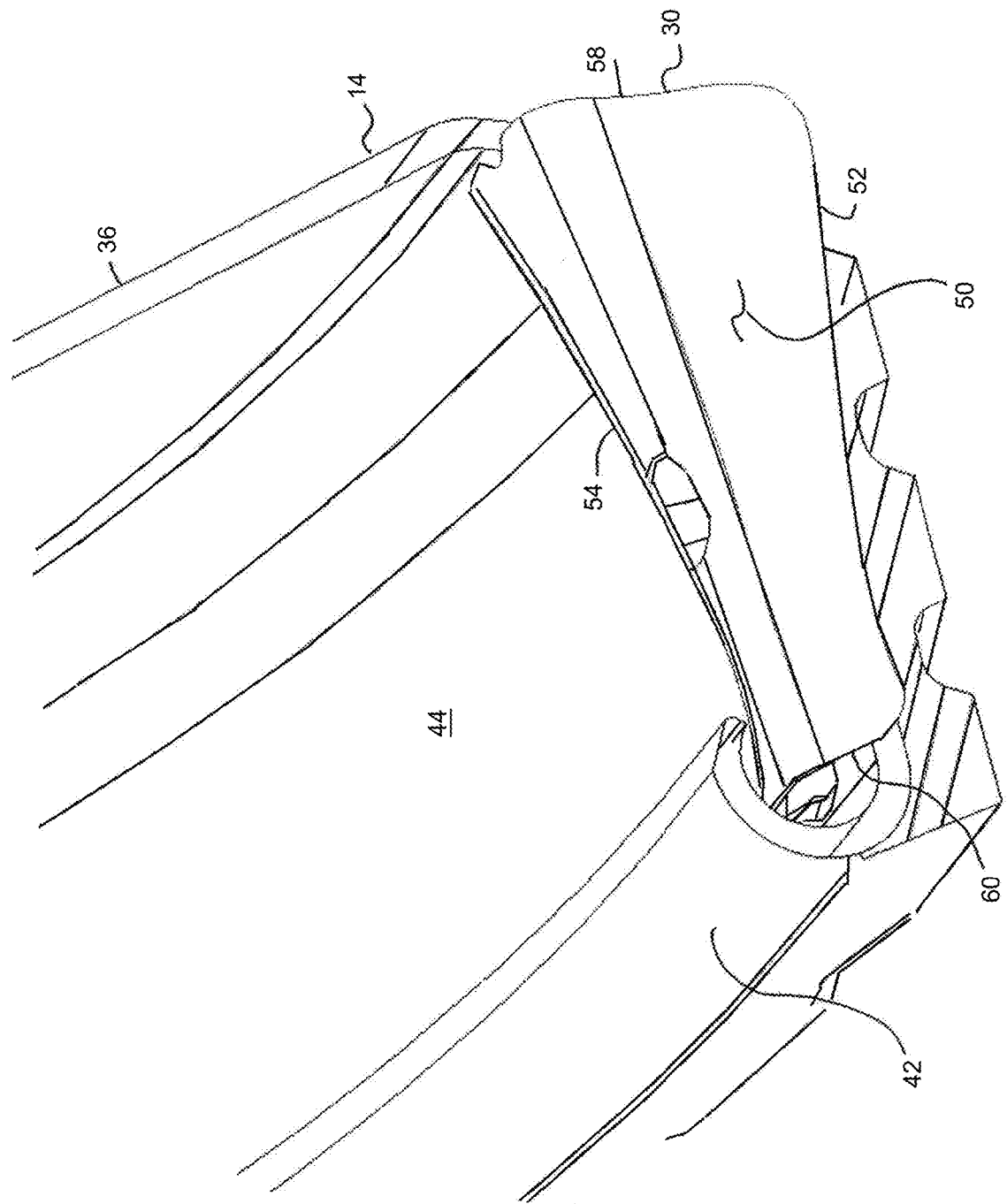
FIG. 3 is a sectional view of the wheel taken showing the ejector.

Referring now to FIG. 2, drive wheel 14 of the work machine 10 as one would find in the prior art is shown with a debris ejector 30 according to one embodiment of the invention. While shown in conjunction with the drive wheel 14, one skilled in the art will understand that debris ejectors 30 may be used will any of the wheels 14, 16, 20 of the work machine 10. The wheel 14 has an axle hub 32 configured to for suitable connection to an axle (not shown) of the track propulsion assembly 12 for rotational movement about a central axis of the wheel 14. The wheel 14 has a cylindrical rim 34 connected to the hub 32 with disc 36 at an inner edge 38 of the rim 34. A track-facing surface 40 of the rim 34 is configured to engage the track 18. As best seen in the cross section of the rim 34 in FIG. 3, the rim 34 features an outer edge 42 configured to provide structural integrity for the wheel 14. In the illustrated embodiment, the outer edge 42 forms an edge curl with an inverted flange that curls inward toward the axis of the wheel 14 and back toward the wheel disc 36. As one familiar with prior art wheels 14, the outer edge 42 has a tendency to hold or trap debris such that the debris tumbles or slides along a hub-facing surface 44 of the rim 34 as the wheel 14 turns.

The debris ejector 30 is attached to the hub-facing surface 44 of the rim 34 to help force trapped debris outside of the wheel 14 as it rotates. As perhaps best seen in FIG. 2, the debris ejector 30 is shaped so as to redirect the debris as the wheel 14 rotates causing the debris to exit the wheel 14. As the wheel 14 rotates, debris falling or sliding on the hub-facing surface 44 of the rim 34 is held by the debris ejector 30 as the debris ejector 30 moves with the wheel 14 from a six o'clock position adjacent the ground up toward the three o'clock position when moving in the Forward (F) direction.

Figure 4:
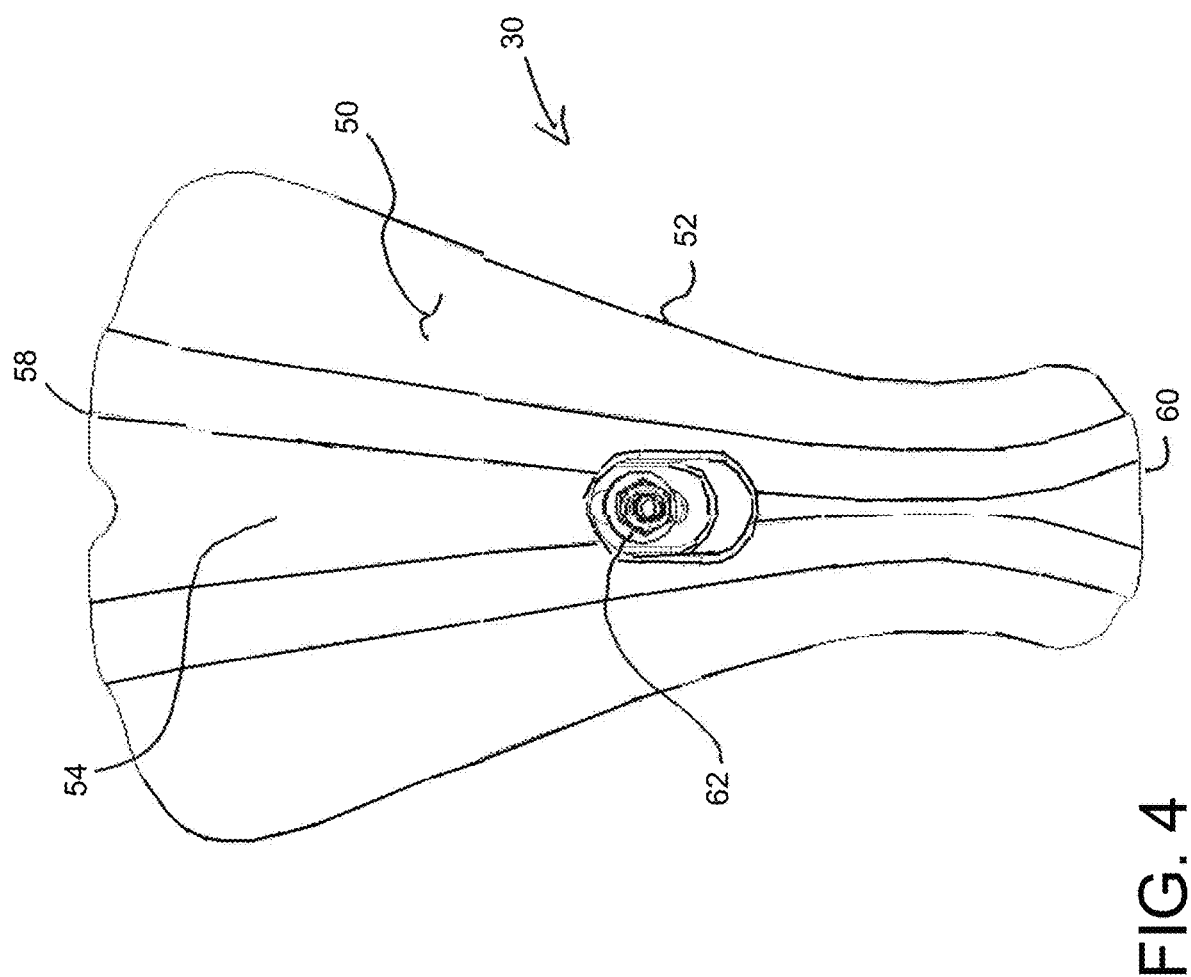
FIG. 4 is plan view of the ejector.
Figure 5:
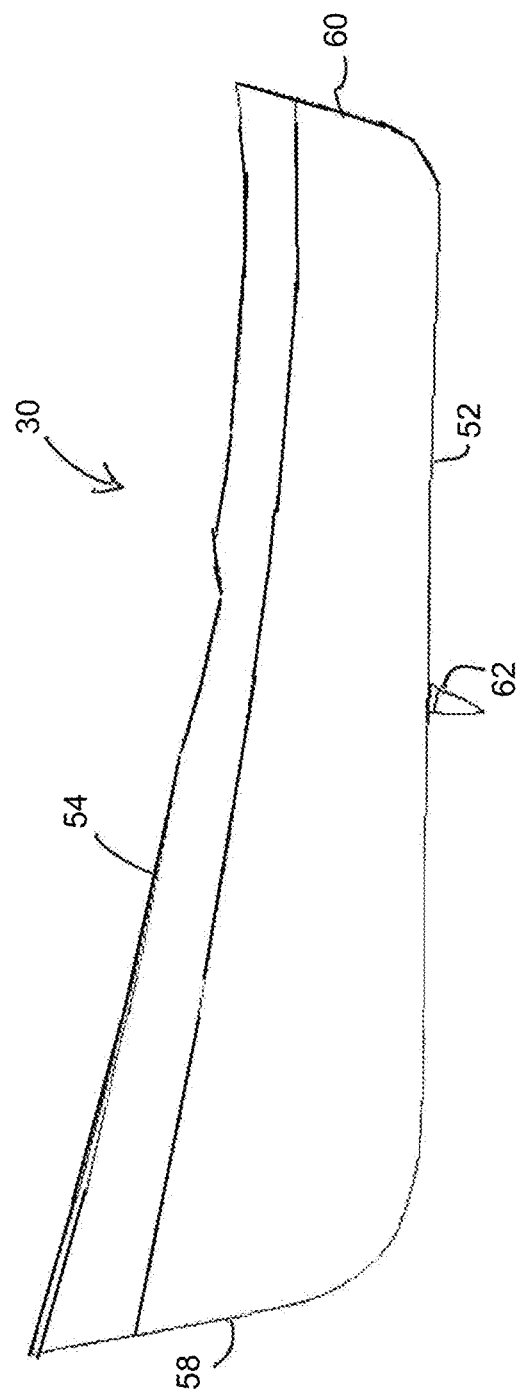
FIG. 5 is a side view of the ejector.

A leading face 50 of the debris ejector slopes from a base 52 adjacent the hub-facing surface 44 towards a ridge 54 of the debris ejector 30 and also slants from an inner end 58 of the debris ejector 30 adjacent the inner edge 38 of the rim 34 to an outer end 60 adjacent the outer edge 42 of the rim 30. As the debris ejector 30 continues to rotate with the wheel 14 up toward the twelve o'clock position, the debris moves over the leading face 50 by the force of gravity. Thus, the shape of the leading face 50 of the debris ejector 30 redirects debris so that the debris not only exits away the hub-facing surface 44 of the wheel 14, but also is discharged horizontally away from the disk 36 of the wheel 14. In one embodiment, the debris ejector 30 has a wedge shape with the inner end 58 of the debris ejector 30 being taller and wider than the outer end 60. Desirably, the shape of the debris ejector 30 is symmetrical to allow the debris ejector 30 to work equally well in forward as well as reverse rotation of the wheel 14. The outer end 60 is desirably configured to fit flush with the outer edge 42 of the rim 34 and underneath any edge curl thereon. In one embodiment, the debris ejector 30 is formed of plastic and is screwed, bolted or otherwise connected to the hub-facing surface 44 of the rim 34 with fastener 62 best seen in FIGS. 4 and 5.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. In a work machine having a tracked propulsion assembly with an endless track belt disposed about at least one wheel to enable movement of the endless track belt, wherein the wheel has an axle hub and a cylindrical rim connected to the axle hub with a disc at an inner edge of the rim, the rim providing a track-facing surface configured to engage the track and a hub-facing surface, the rim also having an outer edge configured to provide structural integrity, the improvement comprising:

a debris ejector attached to the hub-facing surface of the rim, the debris ejector having a leading face that is shaped so to slope from a base adjacent the hub-facing surface towards a ridge of the debris ejector and also slant from an inner end of the debris ejector adjacent the inner edge of the rim to an outer end adjacent the outer edge of the rim such that the shape of the leading face redirects debris so that the debris moves away from the hub-facing surface and away from the disk as the wheel rotates.

2. The tracked work vehicle of claim 1 wherein the debris ejector has a wedge shape with the inner end of the debris ejector being taller and wider than the outer end.

3. The tracked work vehicle of claim 1 wherein the shape of the debris ejector is symmetrical to allow the debris ejector to work equally well in forward as well as reverse rotation of the wheel.

4. The tracked work vehicle of claim 1 wherein as the wheel rotates, debris falling or sliding on the hub-facing surface of the rim is held by the debris ejector as the debris ejector moves with the wheel from a six o'clock position adjacent the ground up toward the three o'clock position and as the wheel continues to rotate up toward the twelve o'clock position, the debris moves over the leading face by the force of gravity.

5. The tracked work vehicle of claim 1 wherein the outer edge of the rim forms an edge curl with an inverted flange that curls inward toward an axis of the wheel and back toward the wheel disc.

6. The tracked work vehicle of claim 5 wherein the outer end is desirably configured to fit underneath the edge curl of the outer edge.

7. The tracked work vehicle of claim 1 wherein the debris ejector is formed of plastic.

8. The tracked work vehicle of claim 1 wherein the debris ejector is connected to the hub-facing surface of the rim with a fastener.

* * * * *